A. M. FARMER.
PUMP.
APPLICATION FILED MAR. 28, 1914.
1,122,376.
Patented Dec. 29, 1914.
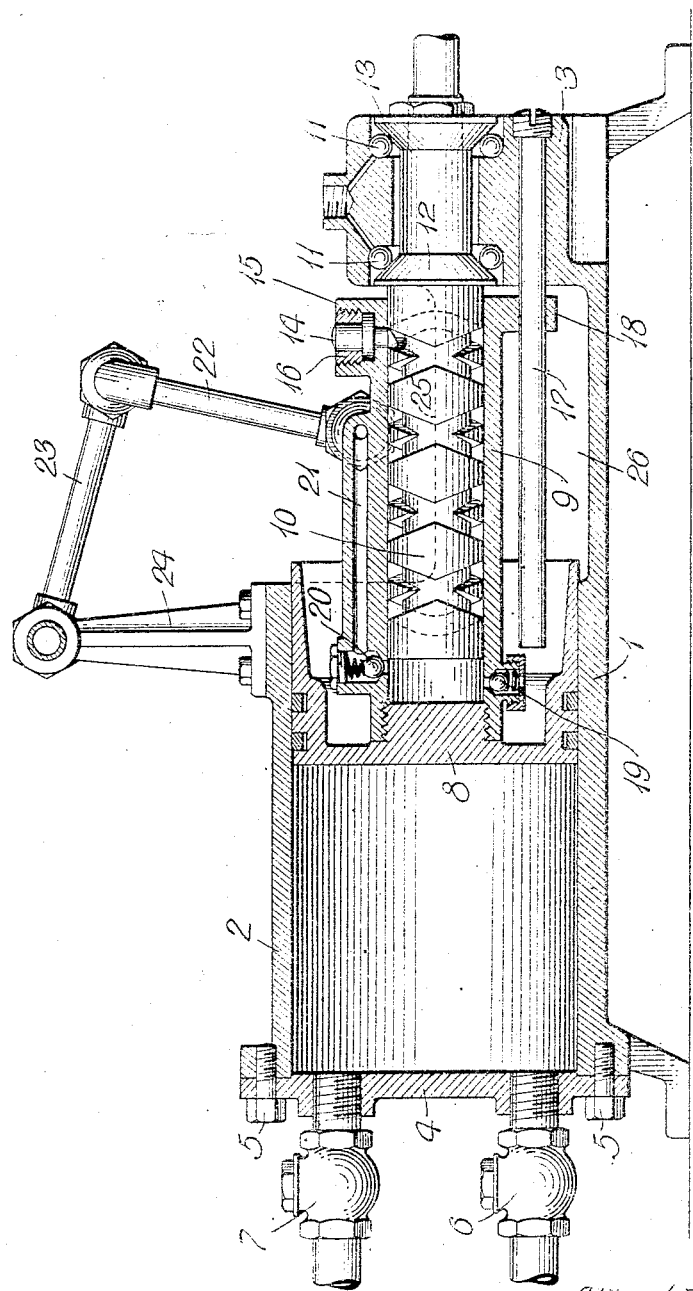
Inventor
Albert M. Farmer,

UNITED STATES PATENT OFFICE.

ALBERT M. FARMER, OF DETROIT, MICHIGAN.

PUMP.

1,122,376. Specification of Letters Patent. Patented Dec. 29, 1914.

Application filed March 26, 1914. Serial No. 827,261.

*To all whom it may concern:*

Be it known that I, ALBERT M. FARMER, a citizen of the United States of America, residing at Detroit, in the county of Wayne and State of Michigan, have invented certain new and useful Improvements in Pumps, of which the following is a specification, reference being had therein to the accompanying drawings.

In the operation of pumps of small capacity for use as compressors, beer pumps or the like where they are usually driven by electric or water motors, it is desirable that they be so disposed as to operate noiselessly. It is also desirable to avoid multiplicity of working parts as they are usually under the control of persons unskilled in the proper care of machinery.

This invention relates to a pump and to an arrangement thereof whereby direct connections may be made with a motor running at considerable speed together with such arrangement of parts as to minimize the liability of disarrangement and the necessity for readjustment and repairs.

The invention consists in the matters hereinafter set forth and more particularly pointed out in the appended claims.

The drawing is a longitudinal section, with parts shown in elevation, of a pump that embodies features of the invention.

Referring to the drawing a main casing or base 1 is formed and preferably integral with a horizontally disposed cylinder 2 near one end and a bearing block or pedestal 3 at the other. A head 4 that is suitably secured as by cap screws 5 to the cylinder, closes the outer end thereof and has an inwardly opening check valve 6 and an outwardly extending check valve 7 which controls respectively the intake and outlet passages through the head.

A piston 8 is reciprocable in the cylinder. A tubular stem 9 is suitably secured on the outer end portion thereof concentric with a shaft 10 that is journaled in the bearing block 3. Preferably the ball thrust bearings 11 between an inner flange 12 and an outer thrust ring 13 serve to reduce the friction of the shaft in the bearings and to lock it from endwise movement. A yoke 14 is swiveled in a boss 15 in which it is retained by an annular nut 16. The inner end portion of the yoke engages a continuous diamond thread indicated at 16 on the shaft 10. A guide rod 17 fixed in the bearing cap 3 engages a lug 18 on the stem 9 to prevent rotation of the piston. Or other suitable means may be employed to effect this result.

As a result of this construction the rotation of the main shaft by a motor reciprocates the piston and thereby operates the pump in practically a noiseless manner. Because of the reduction of motion a high speed motor may be directly connected to the shaft without driving the pump at too high speed.

If desired, the hollow piston stem may be utilized as a pump barrel in which instance an intake check valve 19 and an outlet check valve 20 are provided. A suitable passage 21 from the latter valve is in communication with pipe sections 22 and 23 that are linked or swiveled together and may be supported at the outer end by a suitable bracket 24. Or other flexible discharge connections may be employed. In this latter construction the base 1 is constructed with side walls 25 to form a well or reservoir 26 for supplying liquid to the intake check valve 19, the latter being filled from any convenient source.

Obviously changes in the details of construction may be made without departing from the spirit of my invention and I do not care to limit myself to any particular form or arrangement of parts.

What I claim is:

1. In a pump, a horizontally disposed cylinder having intake and outlet passages, a piston in said cylinder, a non-rotatable hollow stem carried thereby, a driven shaft extending into said stem and provided with a continuous diamond thread, a yoke arranged upon said stem and engaging the thread of said driven shaft, and means in connection with said stem whereby the threaded end of said shaft and said stem can be utilized for pumping purposes.

2. A compound pump comprising a horizontally disposed cylinder having intake and outlet passages, a piston movable in said cylinder, a hollow non-rotatable stem connected to said piston and constituting an auxiliary pump cylinder, a driven shaft extending into said stem and provided with a continuous diamond thread, a yoke upon said stem engaging the thread of said driven shaft, and inlet and outlet connections forming part of said stem.

In testimony whereof I affix my signature in presence of two witnesses.

ALBERT M. FARMER.

Witnesses:
  ANNA M. DORR,
  LEWIS E. FLANDERS.